United States Patent
Mege (10) Patent No.: US 9,755,769 B2
(45) Date of Patent: Sep. 5, 2017

(54) METHOD FOR ESTIMATING A RADIOELECTRIC PROPAGATION CHANNEL

(71) Applicant: AIRBUS DS SAS, Elancourt (FR)

(72) Inventor: Philippe Mege, Bourg la reine (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 15/319,879

(22) PCT Filed: Jun. 17, 2015

(86) PCT No.: PCT/EP2015/063583
§ 371 (c)(1),
(2) Date: Dec. 19, 2016

(87) PCT Pub. No.: WO2015/193366
PCT Pub. Date: Dec. 23, 2015

(65) Prior Publication Data
US 2017/0141858 A1    May 18, 2017

(30) Foreign Application Priority Data

Jun. 17, 2014 (FR) ..................... 14 01367

(51) Int. Cl.
*H04K 1/10* (2006.01)
*H04B 17/309* (2015.01)
(Continued)

(52) U.S. Cl.
CPC ......... *H04B 17/309* (2015.01); *H04L 25/021* (2013.01); *H04L 25/0222* (2013.01); *H04L 25/03171* (2013.01)

(58) Field of Classification Search
CPC ..... H04L 7/0331; H04L 7/033; H04L 7/0338; H04L 7/0066; H04L 7/0337; H04L 7/027;
(Continued)

(56) References Cited

U.S. PATENT DOCUMENTS

2005/0008108 A1  1/2005  Peng
2007/0153926 A1*  7/2007  Arslan .................. H04L 25/022
                                        375/260

FOREIGN PATENT DOCUMENTS

FR  2 814 011 A1  3/2002
FR  2 983 666 A1  6/2013

OTHER PUBLICATIONS

International Search Report as issued in International Patent Application No. PCT/EP2015/063583, dated Sep. 22, 2015.
(Continued)

*Primary Examiner* — Zewdu Kassa
(74) *Attorney, Agent, or Firm* — Pillsbury Winthrop Shaw Pittman LLP (57) ABSTRACT

A method estimates a channel for radioelectric propagation between a transmitter and a receiver. The transmitter transmits a signal including frames that each use $N_1$ frequency subcarriers, over each of which $N_1$ symbols are transmitted, wherein, among the set of symbols, certain symbols, referred to as pilot symbols, are known to the receiver. The method implemented in the receiver includes; determining an overall intermediate covariance matrix $M_2$ of the channel that embodies a time profile of the channel, which profile is symmetrical and centered on the time synchronization position, and a frequency profile of the channel, which profile is symmetrical and centered on the frequency synchronization position; calculating a vector for an intermediate channel C on the basis of the predetermined overall intermediate covariance matrix $M_2$; and estimating the channel on the basis of the calculated vector for the intermediate channel C'.

12 Claims, 3 Drawing Sheets

(51) Int. Cl.
*H04L 25/03* (2006.01)
*H04L 25/02* (2006.01)

(58) Field of Classification Search
CPC ... H04L 25/4904; H04L 27/2647; H04L 1/20; G11B 20/1403; H04N 5/4401; H04B 1/30; H04B 1/28
USPC .......................... 375/260, 259, 219, 295, 316
See application file for complete search history.

(56) References Cited

OTHER PUBLICATIONS

International Preliminary Report on Patentability and the Written Opinion of the International Searching Authority as issued in International Patent Application No. PCT/EP2015/063583, dated Dec. 20, 2016.

* cited by examiner

Figure 3

METHOD FOR ESTIMATING A RADIOELECTRIC PROPAGATION CHANNEL

CROSS-REFERENCE TO RELATED APPLICATIONS

This is the U.S. National Stage of PCT/EP2015/063583, filed Jun. 17, 2015, which in turn claims priority to French Application No. 1401367, filed Jun. 17, 2014, the entire contents of all applications are incorporated herein by reference in their entireties.

TECHNICAL FIELD

The present invention relates to a method for estimating a radio propagation channel between a transmitter and a receiver. It also relates to a corresponding receiving device and a corresponding computer program.

The invention relates more specifically to multicarrier transmission systems, for example of the OFDM type ("Orthogonal Frequency Division Multiplexing") or of the SC-FDMA (Single-Carrier/Frequency Division Multiple Access) type, or alternatively of type FB-MC (Filter Bank Multi-Carrier) type, all these techniques being multicarrier-type transmission techniques.

STATE OF THE ART

This type of transmission is used increasingly frequently. It has been adopted in particular in the LTE ("Long Term Evolution"), TEDS ("TETRA Enhanced Data Service"), DAB ("Digital Audio Broadcasting") and DVB-T ("Digital Video Broadcasting-Terrestrial") systems.

In multicarrier transmission systems the data is generally encoded in the form of symbols organised into frames sent in a signal by a transmitter towards a receiver through a propagation channel, where each frame uses $N_f$ frequency subcarriers over each of which $N_t$ symbols are transmitted, i.e. n total number of symbols in the time-frequency plane equal to $n=N_t \times N_f$.

The propagation channel is defined as the radio path taken by the transmitted signal from the transmitter to the receiver. The signal received by the receiver is generally written in the form $R=E \cdot C + B$, where R is a column vector of dimension n consisting of the received symbols, E is a diagonal matrix of dimension (n,n) the diagonal of which consists of the n symbols transmitted in a frame, C is a column vector, called a channel vector, of dimension n representing the propagation channel and B is a column vector of dimension n representing the noise of the channel. In what follows vectors R, C and B will be represented conventionally in the form of a concatenation of $N_t$ vectors, where each is of dimension $N_f$, the first vector corresponding to the $N_f$ symbols, corresponding to the first symbol of the frame, located in succession on $N_f$ sub-carriers, and the following vectors corresponding in a similar manner to the $N_t$ successive symbols. Similarly, in the following description, the diagonal of matrix E consists of a concatenation, for the $N_t$ successive symbols in the frame, of the $N_f$ successive values of the propagation channel for the successive sub-carriers.

The propagation channel includes, for a signal transmitted by the transmitter, a plurality of paths between the transmitter and the receiver, due in particular to the signal's reflection and/or diffraction on obstacles such as, for example, hills, buildings, vehicles, etc. Each path is thus characterised by a delay and an attenuation, and the delay between the signal received by the receiver over the shortest radio path and the signal received by the receiver over the longest radio path constitutes the channel's temporal spread. All the paths with their power values and their delays constitute the channel's temporal profile. Depending on the characteristics of the propagation environment, a typical propagation temporal profile is expected.

The different paths taken by the signal can also combine destructively with one another, in particular when the signal's reflections occur on obstacles located close to the receiver and/or the transmitter. More specifically, each path can be affected by a fading known as "Rayleigh" fading, known to those skilled in the art, the pseudo-frequency of which is equal to the double of the Doppler frequency, where this Doppler frequency is determined from the speed of the transmitter and/or of the receiver when at least one of the two is mobile, and from the carrier frequency of the transmitted signal. The difference between the lower frequency and the higher frequency between the signals received by the receiver over the different radio paths of a monochrome signal transmitted by the transmitter constitutes the channel's frequency spread. The power spectrum of this received signal is called the channel's frequency profile. Depending on the characteristics of the propagation environment, a typical propagation frequency profile is expected.

A multi-path channel with Rayleigh fading may therefore be selective in terms of time and/or of frequency.

To estimate the propagation channel certain symbols, distributed on the time-frequency plane, are inserted in each frame among the useful information intended for the receiver. These symbols, called "pilot symbols", are known to the transmitter and to the receiver. They are used for purposes of synchronising and estimating the propagation channel.

In a multi-carrier system the effect of the propagation channel on a data symbol, in the time-frequency plane, is generally modelled simply by a complex multiplying coefficient which the receiver attempts to estimate in order to determine the transmitted symbol with the least possible error. The channel estimation is defined as being the determination of these coefficients for all the transmitted symbols.

In a known manner the receiver generally starts by estimating the channel at the position of the pilot symbols; it then makes an estimation of the channel over the entire frame. The channel estimation for the positions which are not pilot symbols is generally made by means of an interpolation from the channel estimation for the pilot symbols.

Document FR2814011 describes a method for estimating a channel enabling the known physical characteristics of the propagation channel to be taken into account. However, the described method is very constrictive in terms of complexity. To resolve these disadvantages partially, patent application FR2983666 A1 filed by the Applicant describes a method for estimating a channel of lesser complexity, enabling the known physical characteristics of the propagation channel to be taken into account, and in particular implementing the maximum a posteriori, or MAP, criterion.

The resolution of the problem of estimating the channel in the sense of the MAP amounts to maximising term $$e^{-\frac{\|R-EC\|^2}{2\sigma^2}} \cdot e^{-\frac{C^H \cdot M_1^{-1} \cdot C}{2}}, (,$$

i.e. in minimising the opposite of the logarithm of this expression equal to, $$\frac{\|R - EC\|^2}{\sigma^2} + C^H \cdot M_1^{-1} \cdot C$$

whilst responding to the physical variations of the channel in terms of time and frequency, expressed by means of the channel's global covariance matrix $M_1$. $\sigma^2$ represents the variance of noise in the channel.

The channel's global covariance matrix $M_1$ is obtained from knowledge of the channel's physical variations, i.e.:

the channel's temporal profile, defined in a time window, which causes variations of the propagation channel along the frequency axis, and from which a covariance matrix $M_{1f}$ can be calculated, therefore expressing the channel's frequency variations due to the said temporal profile, and the frequency profile, defined in a frequency window, which causes variations of the propagation channel along the time axis, and from which a covariance matrix $M_{1f}$ can be calculated, therefore expressing the channel's time variations due to the said frequency profile.

Temporal covariance matrix $M_{1t}$ expressing the channel's temporal constraint may be obtained by an inverse Fourier transform of the channel's frequency profile, whereas frequency covariance matrix $M_{1f}$ expressing the channel's frequency constraint may be obtained by a Fourier transform of the channel's temporal profile. Global covariance matrix $M_1$ of the channel is the Kronecker tensor product of the two covariance matrices, temporal covariance matrix $M_{1f}$ and frequency covariance matrix $M_{1f}$; $M1 = M1t \otimes M1f$.

The theoretical hypothesis considered to estimate the channel in the frequency field is often a temporal profile of the channel which is symmetric call and centred on a position called the "signal's timing synchronisation position". Such a timing synchronisation position of the signal is generally predetermined in a known manner, for example by means of a specific timing synchronisation sequence (or by other means), and is used by the receiver to synchronise temporally the signal received from the transmitter, i.e. to determine a precise instant associated with the window of the signal's temporal profile (in this case the middle of the window). In this case the eigenvalues and the eigenvectors of frequency covariance matrix $M_{1f}$ are real.

In practice, however, the channel's temporal profile is not necessarily symmetrical and centred on the timing synchronisation position. It may, for example, be symmetrical but centred on an effective central timing position which differs from the position called the signal's "timing synchronisation position" since timing synchronisation is often accomplished with the first propagation paths of the received signals, which are generally the least attenuated, whereas subsequent paths maybe more attenuated and substantially delayed but also significant. In this case the eigenvalues of frequency covariance matrix $M_{1f}$ are real, but the eigenvectors of frequency covariance matrix $M_{1f}$ are complex.

Similarly, the theoretical constraint considered in the temporal field corresponds to a frequency profile of the channel which is symmetric and centred on a position known as the "signal's frequency synchronisation position". Such a frequency synchronisation position of the signal may be predetermined in a known manner, for example by means of a specific frequency synchronisation sequence (or by other means), and is used by the receiver to synchronise frequentially the signal received from the transmitter, i.e. to determine a precise frequency associated with the spread window of the signal's frequency profile (in this case the middle of the window). In this case the eigenvalues and the eigenvectors of frequency covariance matrix $M_{1t}$ are real.

In practice, however, the channel's frequency profile is not necessarily symmetrical and centred on the frequency synchronisation position. It may, for example, be symmetrical but centred on an effective central frequency position which is different to the signal's "frequency synchronisation position". In this case the eigenvalues of covariance matrix $M_{1t}$ are real, but the eigenvectors of covariance matrix $M_{1t}$ are complex.

The resolution of the problem of estimating the channel in the sense of the MAP with complex eigenvectors in temporal covariance matrix $M_{1f}$ and/or frequency matrix $M_{1t}$ makes the receiver complex and expensive since its memory and the capacity of its processor must be substantial in order to process the received data to estimate the propagation channel, which represents a substantial disadvantage.

GENERAL PRESENTATION OF THE INVENTION

The present invention seeks to resolve this disadvantage by proposing a method for estimating a radio propagation channel between a transmitter and a receiver which enables the complexity and cost of implementation of the receiver to be reduced whilst enabling the estimation of a channel the constraints of which correspond to those of reality.

To this end the invention concerns firstly a method for estimating a radio propagation channel between a transmitter and a receiver, where the said transmitter transmits a signal including frames each of which uses $N_f$ frequency subcarriers over each of which $N_t$ symbols are transmitted, where among all the symbols, certain symbols, called pilot symbols, are known to the said receiver, where the said signal is synchronised by the receiver from a timing synchronisation position and a frequency synchronisation position, where the temporal profile of the channel is symmetrical and centred on an effective central timing position $T_{mean}$ different to the timing synchronisation position, where the frequency profile of the channel is symmetrical and centred on an effective central frequency position $f_{mean}$ different to the frequency synchronisation position. The method implemented by the receiver is noteworthy due to the fact that it includes the steps of:

determination of an intermediate frequency covariance matrix $M_{2f}$ representing the frequency variations of the channel due to a theoretical temporal profile of the channel, which is symmetrical and centred on the timing synchronisation position, where this theoretical temporal profile of the channel is obtained from the temporal profile of the channel translated to a time of $(-T_{mean})$ such that it is symmetrical around the timing synchronisation position (zero time position);

determination of an intermediate temporal covariance matrix $M_{2t}$ representing the temporal variations of the channel due to a theoretical frequency profile of the channel, which is symmetrical and centred on the frequency synchronisation position, where this theoretical frequency profile of the channel is obtained from the frequency profile of the channel translated to a frequency of $(-f_{mean})$ such that it is symmetrical around the frequency synchronisation position (zero frequency position);

calculation of an intermediate global covariance matrix $M_2$ according to the Kronecker product: $M_2 = M_{2f} \otimes M_{2t}$;

calculation of a matrix E' according to the relationship $E' = E \cdot T^H$, where $T = T_t \otimes T_f$ and in which E is a diagonal matrix including the pilot symbols transmitted in a frame at the positions of the pilot symbols, where the other symbols are zero, $T_f$ is a diagonal centring matrix $(N_f, N_f)$ defined by $$T_f = \begin{bmatrix} 1 & 0 & \ldots & \ldots & 0 \\ 0 & e^{i\varphi} & \ldots & & \\ \ldots & \ldots & e^{i2\varphi} & \ldots & \\ \ldots & & \ldots & \ldots & 0 \\ 0 & \ldots & \ldots & 0 & e^{i(Nf-1)\varphi} \end{bmatrix}$$

where $\varphi = 2\pi \cdot \dfrac{\tau_{moyen}}{N_f}$ and T is a diagonal centring matrix $(N_t, N_t)$ defined by $$\cdot T_t = \begin{bmatrix} 1 & 0 & \ldots & \ldots & 0 \\ 0 & e^{i\psi} & \ldots & & \\ \ldots & \ldots & e^{i2\psi} & \ldots & \\ \ldots & & \ldots & \ldots & 0 \\ 0 & \ldots & \ldots & 0 & e^{i(Nt-1)\psi} \end{bmatrix} ($$

where $\psi = -2\pi \cdot \dfrac{f_{moyen}}{N_t}$;

calculation of a column vector representing an intermediate channel C' which minimises the relationship $$\frac{\|R - E' \cdot C'\|^2}{\sigma^2} + C'^H \cdot M_2^{-1} \cdot C'$$

where R is a column vector of dimension $(N_t \times N_f)$ consisting of the received symbols, and;

estimation of the propagation channel according to the relationship $C = T^H \cdot C'$, from calculated vector C'.

The words "determination of an intermediate frequency covariance matrix $M_{2f}$ representing the frequency variations of the channel due to the channel's temporal profile centred on the timing synchronisation position" are understood to mean that the effects of the signal's temporal profile on the signal's frequency variations are determined when this temporal profile is centred on the signal's timing synchronisation position.

Similarly, the words "determination of an intermediate temporal covariance matrix $M_{2t}$ representing the temporal variations of the channel due to the channel's frequency profile centred on the frequency synchronisation position" are understood to mean that the effects of the signal's frequency profile on the signal's temporal variations are determined when this frequency profile is centred on the signal's frequency synchronisation position.

$$A \otimes B = \begin{pmatrix} a_{11}B & \ldots & \ldots & a_{1n}B \\ \vdots & \ldots & \ldots & \vdots \\ a_{m1}B & \ldots & \ldots & a_{mn}B \end{pmatrix}.$$

The Kronecker product of two matrices A and B, where matrix A has components $(a_{ij})$, where i is an integer of between 1 and m and j is an integer of between 1 and n, is the matrix product noted $A \otimes B$ and defined by the following expression:

When the channel's temporal profile is symmetrical and centred around effective central timing position $T_{mean}$ but effective central timing position $T_{mean}$ is not equal to the timing synchronisation position, frequency covariance matrix $M_{1f}$ expressing the variation of the channel along the frequency axis is a matrix with complex eigenvectors. The method according to the invention allows definition, from a given temporal profile, but centred around the timing synchronisation position, for example by a Fourier transform of the channel's temporal profile, of an intermediate frequency covariance matrix $M_{2f}$ which is equal to frequency covariance matrix $M_{1f}$ of the real channel, but which has real eigenvectors. In other words, intermediate frequency covariance matrix $M_{2f}$ is equal to the constraint due to the channel's temporal profile, but with a temporal offset such that the constraint in terms of the channel's temporal profile is symmetrical and centred not on effective central timing position $T_{mean}$ but on the timing synchronisation position. The channel's temporal profile constraint is then centred and symmetrical around the timing synchronisation position. In addition, in the special case in which effective central timing position $T_{mean}$ is equal to the timing synchronisation position is then $M_{2f} = M_{1f}$.

Similarly, when the channel's frequency profile is symmetrical around effective central frequency position $f_{mean}$ but said effective central frequency position $f_{mean}$ is not equal to the frequency synchronisation position, temporal covariance matrix $M_{1t}$ expressing the variation of the channel along the temporal axis is a matrix with complex eigenvectors. The method according to the invention allows definition, from a given frequency profile, but now centred around the frequency synchronisation position, for example by a inverse Fourier transform of the channel's frequency profile, of an intermediate temporal covariance matrix $M_{2t}$, which is equal to temporal covariance matrix $M_{1t}$ of the real channel, but which has real eigenvectors. In other words, intermediate temporal covariance matrix $M_{2t}$ is equal to the constraint due to the channel's frequency profile, but with a frequency offset such that the constraint in terms of the channel's frequency profile is symmetrical and centred not on effective central frequency position $f_{mean}$ but on the frequency synchronisation position. The constraint in terms of the channel's frequency profile is then centred and symmetrical around the frequency synchronisation position. In addition, in the special case in which effective central frequency position $f_{mean}$ is equal to the frequency synchronisation position then $M_{2t} = M_{1t}$.

Global intermediate covariance matrix $M_2$ which is the Kronecker product of intermediate temporal covariance matrix $M_{2t}$ and of intermediate frequency covariance matrix $M_{2f}$ is thus equal to a virtual propagation channel C' and advantageously has real eigenvectors. To estimate channel C' corresponding to this intermediate matrix $M_2$, a method may be used based on the maximum a posteriori (MAP) criterion such as, for example, the method described in document FR2983666 A1 or alternatively in document FR2814011. Column vector C corresponding to the real channel is then advantageously obtained from intermediate channel matrix C' and from centring matrix T defined according to the invention.

Use of the separability of intermediate covariance matrix $M_2$<<, the eigenvectors of which are real, is verifiable in terms of complexity. Thus, for a frame of n symbols, with $N_f$ subcarriers and $N_t$ time symbols, intermediate covariance matrix $M_2$ is of dimension (n,n) with n=$N_f \times N_t$. This matrix is equal to the Kronecker product of a covariance matrix $M_{2f}$ of dimension ($N_f$, $N_f$) with a covariance matrix $M_{2t}$ of dimension ($N_t$, $N_t$). It is therefore sufficient to record ($N_t^2$+$N_t^2$) values instead of ($N_t^2 \times N_t^2$) values. The method of the present invention thus enables the complexity of the channel estimation to be reduced significantly, particularly in terms of required storage memory, taking account of the real physical constraints of the propagation channel.

Preferably, on the diagonal of matrix E, the transmitted symbols are concatenated such that, for the first symbol of the frame, firstly the symbols corresponding to the successive subcarriers are placed, and then the same is done for the second symbol of the frame, and so forth until the last symbol of the frame. According to one aspect of the invention the method includes a preliminary step of determination of the signal's timing synchronisation position and frequency synchronisation position.

According to another aspect of the invention the method includes a step of determination of the signal's effective central timing position $T_{mean}$ and effective central frequency position $f_{mean}$.

The step of calculation of intermediate channel vector C' preferably includes the sub-steps of:
decomposition of covariance matrices $M_{2f}$ and $M_{2t}$ into eigenvectors according to the relationships $M_{2f}=W_F^H N_F W_F$ et $M_{2t}=W_T^H N_T W_T$, in which:
$W_F$ is a matrix of eigenvectors of matrix $M_{2f}$;
$N_F$ is a diagonal matrix including eigenvalues associated with the eigenvectors of matrix $M_{2f}$;
$W_T$ is a matrix of eigenvectors of matrix $M_{2t}$;
$N_T$ is a diagonal matrix including eigenvalues associated with the eigenvectors of matrix $M_{2t}$;
calculation of the Kronecker product of the matrices of eigenvectors $W_F$ and $W_T$, to obtain a global matrix of eigenvectors W;
calculation of a global diagonal matrix of eigenvectors N equal to the Kronecker product of matrices of eigenvalues $N_F$, and $N_T$; and
calculation of intermediate channel vector C' using the pilot symbols given by matrix E' and of the matrices of eigenvectors W and of eigenvalues N using the maximum a posteriori criterion.

A "pilot symbol" is understood to mean all symbols known to the receiver, i.e. the pilot symbols, as designated in the standards of known multicarrier systems such as LTE and TEDS, and/or the synchronisation symbols and/or the symbols which have previously been demodulated and decided by the receiver in a prior processing step.

Since matrix W of the eigenvectors is the Kronecker product of two matrices $W_F$ and $W_T$ of eigenvectors, only $(N_f \times N_f + N_t \times N_t) = N_f^2 + N_t^2$ values are required to represent it. Similarly, since diagonal matrix N of the eigenvectors is the Kronecker product of the two diagonal matrices $N_F$ and $N_T$, only $N_f+N_t$ values are required to represent it. This enables the complexity of the estimation of the channel to be reduced significantly, particularly in terms of the required storage memory.

According to one implementation, the step of calculation of intermediate channel vector C' includes the sub-steps of:
calculation of a matrix P according to the relationship $P= \sqrt{N} \cdot W \cdot E'^H \cdot E' \cdot W^H \cdot \sqrt{N}$;
decomposition of matrix P into eigenvectors according to relationship $P=X^H Q X$ in which X is a matrix of eigenvectors of matrix P and Q is a diagonal matrix including eigenvalues associated with the eigenvectors of matrix P; and
calculation of vector C' according to the relationship $C''=W'' \cdot \sqrt{N} \cdot X^H \cdot (Q+\sigma^2 \cdot I)^{-1} \cdot X \cdot \sqrt{N} \cdot W \cdot E'^H \cdot R$ in which I is the identity matrix, R is a vector including the received symbols and $\sigma^2$ represents the power value of the noise in the channel.

More specifically, matrix $\sqrt{N}$ is a diagonal matrix the terms of the diagonal of which are the square roots of the terms of the diagonal of diagonal matrix N.

When the pilot symbols are regularly distributed by time and frequency, matrix P can be written in the form of a Kronecker product of two matrices relative, respectively, to the frequency domain and the time domain. In this case the complexity of the channel estimation is reduced still further.

According to one preferred implementation, the step of calculation of matrix C' includes the sub-steps of:
extraction of a matrix W' from matrix W and of a matrix N' from matrix N, where matrix N' includes a determined number n' of eigenvalues of matrix N and matrix W' includes the eigenvectors associated with these n' eigenvalues; and
calculation of matrix C' using the pilot symbols and the matrices of eigenvectors W' and of eigenvalues N' using the maximum a posteriori criterion.

The n' eigenvalues are preferably the highest eigenvalues of matrix N.

This enables the complexity of channel estimation to be reduced whilst minimising loss of performance, due to the fact that the eigenvectors retained in matrix W' account for most of the energy, represented by the sum of the eigenvalues retained in matrix N'.

Advantageously, the n' eigenvectors of matrix W' are the Kronecker products of a limited number $n'_f$ of eigenvectors of matrix $W_F$ and of a limited number $n'_t$ of eigenvectors of matrix $W_T$ and the n' eigenvalues of matrix N' are the products of the eigenvalues of matrix $N_F$ corresponding to the $n'_f$ eigenvectors of matrix $W_F$ and eigenvalues of matrix $N_T$ corresponding to the $n'_t$ eigenvectors of matrix $W_T$.

In this case matrix W' is separable in terms of time and frequency. Only ($n'_f \times N_f + n'_t \times N_t$) values are then required to represent it. The complexity of the method is reduced still further by this means.

n' is preferably less than or equal to the number of pilot symbols in each frame.

Advantageously, the step of calculation of matrix C' includes the sub-steps of:
calculation of a matrix P according to the relationship $P'= \sqrt{N'} \cdot W' \cdot E'^H \cdot E' \cdot W'^H \cdot \sqrt{N'}$;
decomposition of matrix P' into eigenvectors according to relationship $P'=X'^H Q' X'$ in which X' is a matrix of eigenvectors of matrix P' and Q' is a diagonal matrix including eigenvalues associated with the eigenvectors of matrix P'; and
calculation of matrix C' according to the relationship $C'=W'^H \cdot \sqrt{N'} \cdot X'^H \cdot (Q'+\sigma^2 \cdot I)^{-1} \cdot X' \cdot \sqrt{N'} \cdot W' \cdot E'^H \cdot R$ in which I is the identity matrix, R is a vector including the received symbols and $\sigma^2$ represents the power value of the noise in the channel.

More specifically, matrix $\sqrt{N'}$ is a diagonal matrix the terms of the diagonal of which are the square roots of the terms of the diagonal of diagonal matrix N'.

When the pilot symbols are regularly distributed in terms of time and frequency, matrix P' can be written in the form of a Kronecker product of two matrices relative, respectively, to the frequency domain and the time domain. In this case the complexity of the channel estimation is reduced still further.

Advantageously, the signal is a multicarrier signal, and in particular an OFDM signal.

The invention can also be applied to single-carrier systems. In this case there is then $M_{2t}=M_{1f}=[1]$, where $[1]$ represents the identity matrix of dimension (1, 1), this matrix is degenerate in a scalar equal to 1.

The invention also concerns a receiver device able to receive from a transmitter at least one signal transmitted through a radio propagation channel, where the said signal includes frames each using $N_f$ frequency subcarriers over each of which $N_t$ symbols are transmitted, where from among all the symbols certain symbols, called pilot symbols, are known to the said receiver device, where the signal is synchronised by the receiver from a timing synchronisation position and from a frequency synchronisation position, where the channel's temporal profile is symmetrical and centred around an effective central timing position $T_{mean}$ separate from the timing synchronisation position, and where the channel's frequency profile is symmetrical and centred around an effective central frequency position $f_{mean}$ separate from the frequency synchronisation position. The method implemented in the receiver is noteworthy due to the fact that it includes:

- means for determining an intermediate frequency covariance matrix $M_{2f}$ representing the channel's frequency variations, due to a theoretical temporal profile of the channel, which is symmetrical and centred on the timing synchronisation position, where this theoretical temporal profile of the channel is obtained from the channel's temporal profile translated to a time of $(-T_{mean})$ so as to be symmetrical around the timing synchronisation position;
- means for determining an intermediate temporal covariance matrix $M_{2t}$ representing the channel's temporal variations, due to a theoretical frequency profile of the channel, which is symmetrical and centred on the frequency synchronisation position, where this theoretical frequency profile of the channel is obtained from the channel's frequency profile translated to a frequency of $(-f_{mean})$ so as to be symmetrical around the frequency synchronisation position;
- means for calculating an intermediate global covariance matrix $M_2$ according to the Kronecker product: $M_2 = M2t \otimes M_{2f}$;
- means for calculating a matrix E' according to the relationship $E' = E \cdot T^H$, where $T = T_t \otimes T_f$ and in which E is a diagonal matrix including the pilot symbols transmitted in a frame at the positions of the pilot symbols, where the other symbols are zero, $T_F$ is a diagonal centring matrix $(N_f, N_f)$ defined by $$T_f = \begin{bmatrix} 1 & 0 & \cdots & \cdots & 0 \\ 0 & e^{i\varphi} & \cdots & & \\ \cdots & \cdots & e^{i2\varphi} & \cdots & \\ \cdots & & \cdots & \cdots & 0 \\ 0 & \cdots & \cdots & 0 & e^{i(Nf-1)\varphi} \end{bmatrix}, \text{ where } \varphi = 2\pi \cdot \frac{T_{moyen}}{N_f}$$

and $T_t$ is a diagonal centring matrix $(N_t, N_t)$ defined by $$rT_t = \begin{bmatrix} 1 & 0 & \cdots & \cdots & 0 \\ 0 & e^{i\psi} & \cdots & & \\ \cdots & \cdots & e^{i2\psi} & \cdots & \\ \cdots & & \cdots & \cdots & 0 \\ 0 & \cdots & \cdots & 0 & e^{i(Nt-1)\psi} \end{bmatrix}$$

where $\psi = -2\pi \cdot \frac{J_{moyen}}{N_t}$;

- means for calculating a column vector representing an intermediate channel C' which minimises the relationship $$\frac{\|R - E' \cdot C'\|^2}{\sigma^2} + C'^H \cdot M_2^{-1} \cdot C'$$

where R is a column vector of dimension $(N_{t \times Nf})$ consisting of the received symbols, and;
- means for estimating the propagation channel according to the relationship $C = T^H \cdot C'$, from calculated vector C'.

The invention also concerns a computer program including instructions for implementing the method according to the invention when the program is executed by at least one processor.

Figure 2:
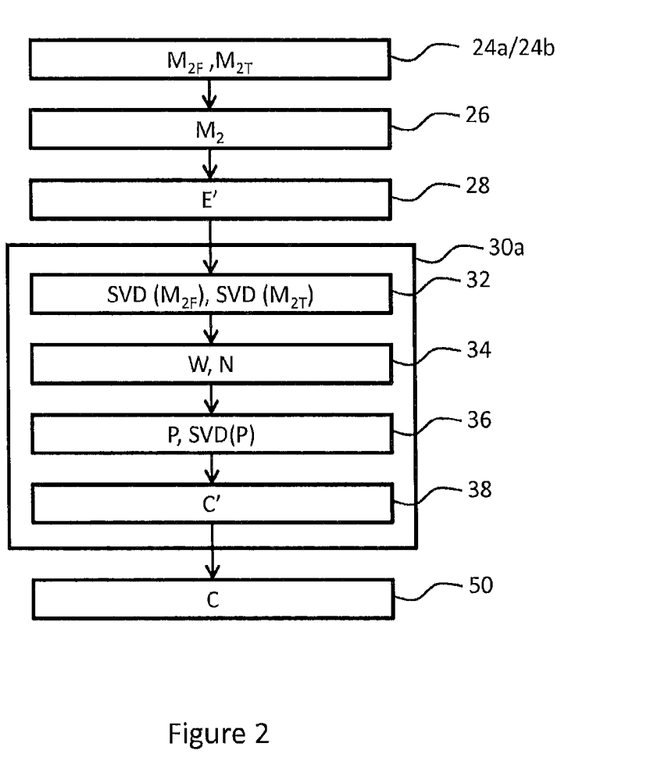
FIG. 2 is a flowchart illustrating the operation of the channel estimation method according to a first implementation of the invention.
Figure 3:
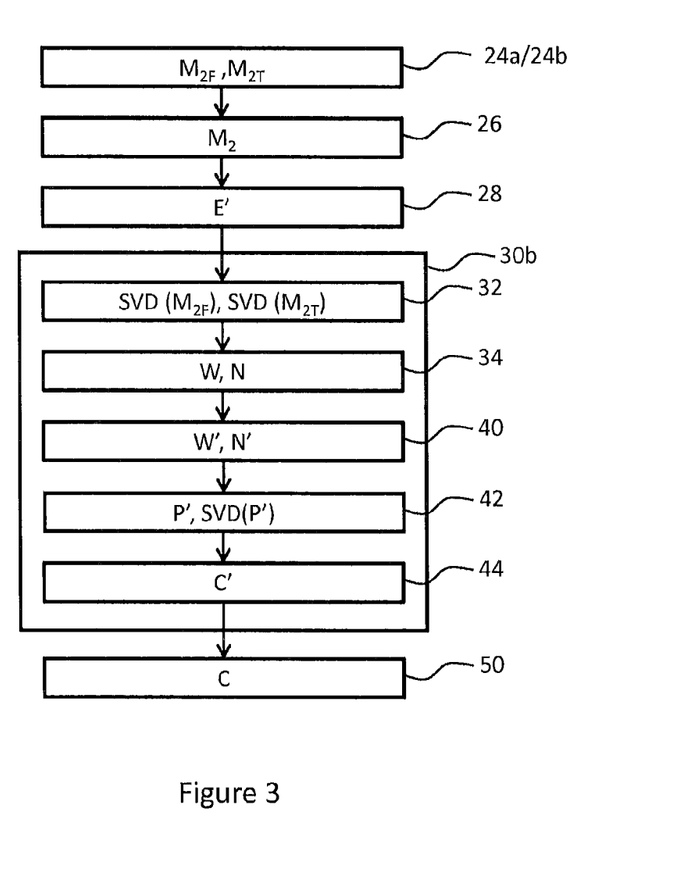
FIG. 3 is a flowchart illustrating the operation of the channel estimation method according to a second implementation of the invention.

The flow diagrams of FIGS. 2 to 3 illustrate schematically the functioning of this computer program, for preferred implementations of the invention.

DESCRIPTION OF THE FIGURES

Implementations of the invention will now be described more precisely but not restrictively with reference to the appended illustrations in which.

DETAILED DESCRIPTION OF THE INVENTION

I. Receiver Device 2

Figure 1:
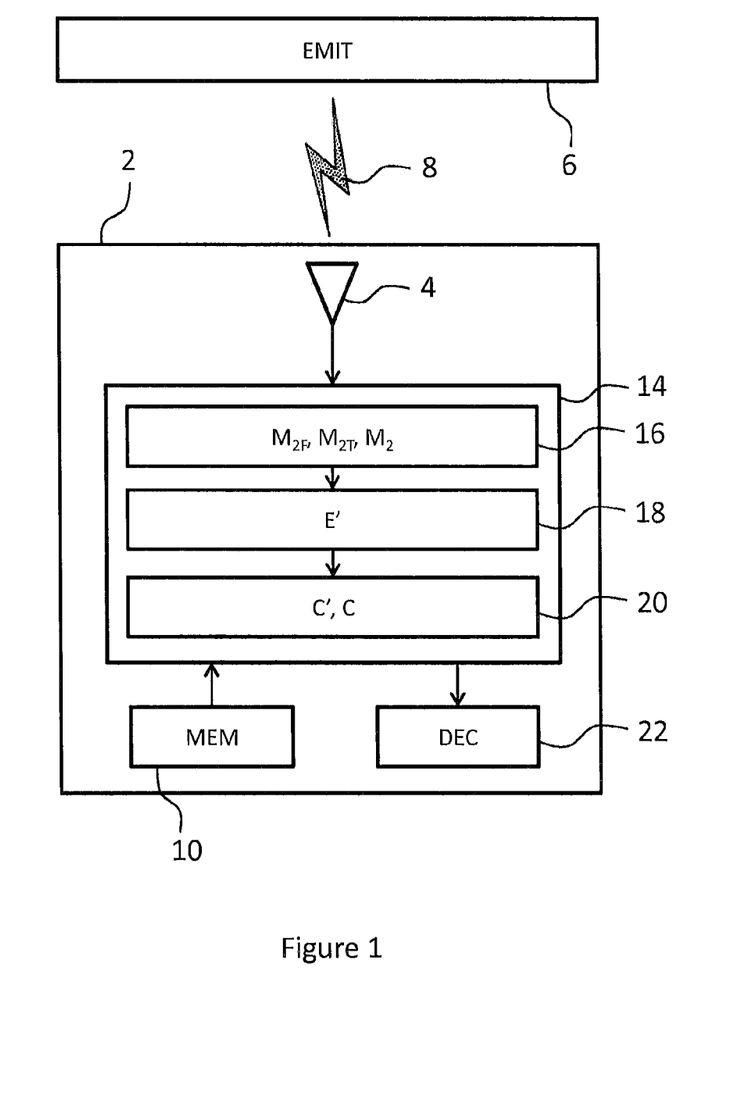
FIG. 1 is a diagram of a receiver device according to the invention.

FIG. 1 represents a receiver device 2 of a multicarrier transmission system such as, for example, a mobile terminal of a professional mobile radio system PMR ("Professional Mobile Radio") of the TEDS type. This is in no sense restrictive of the scope of the present invention, which can be applied more generally to all multicarrier transmission systems, or to a single-carrier transmission system.

Receiver 2 includes an antenna 4 for the reception of an OFDM signal transmitted from a transmitter 6 through a radio propagation channel 8.

The OFDM signal transmitted by transmitter 6 is organised into frames of signals distributed over time and over frequency, among which certain symbols, called pilot symbols, are known to receiver 2 and are stored in a memory 10 of said receiver 2. Each frame thus includes n symbols with $N_f$ subcarriers and $N_t$ time symbols, where n is equal to the product of $N_f$ and of $N_t$.

Receiver 2 includes a channel estimation module 14 using the pilot symbols stored in memory 10 and its knowledge of the physical constraints of channel 8 in the time and frequency domains to estimate propagation channel 8.

Firstly, in the frequency domain, the frequency profile of channel 8, due to the reflections on proximate obstacles, has a limited frequency spread. This frequency spread, also called the Doppler spread, is between $-F_D$ and $+F_D$, where $F_D$ is the maximum Doppler frequency given by the relationship $$F_D = \frac{v}{c} \cdot F_{p'},$$

in which v is the speed of mobile receiver 2, "c" is the speed of light, and $F_P$ is the carrier frequency. The components of the frequency spectrum of propagation channel 8 are therefore between fixed limits for given conditions of the maximum speed of mobile receiver 2 and of the carrier frequency. The frequency profile of channel 8 is centred and symmetrical around an effective central frequency position $f_{mean}$ of channel 8 and defines a temporal covariance matrix $M_{1t}$.

Secondly, the temporal profile of channel 8, due to the reflections on distant obstacles, has a limited temporal spread. This temporal spread depends on the frequency band used and the environment. As examples, at a carrier frequency of 400 MHz, in an urban environment, the temporal spread is of the order of 5 µs whereas in a mountainous environment this spread is of the order of 15 µs. The components of the temporal profile of channel 8 are therefore between fixed limits for given environmental conditions. The temporal profile of channel 8 is centred and symmetrical around an effective central timing position $T_{mean}$ and defines a frequency covariance matrix $M_{1f}$ of channel 8.

The characteristics of the frequency profile and of the temporal profile of channel 8 are known to receiver 2 and are stored in memory 10.

Receiver 2 is also configured to determine and/or to receive a timing synchronisation position of the signal and a frequency synchronisation position of the signal. The timing synchronisation position may be predetermined in a known manner, for example by means of a specific timing synchronisation sequence (or by any other means). The frequency synchronisation position may be predetermined in a known manner, for example by means of a specific frequency synchronisation sequence (or by any other means).

Receiver 2 is also configured to determine an effective central timing position of the corresponding signal in the middle of the spread window of the received signal's temporal profile, and an effective central frequency position of the corresponding signal in the middle of the spread window of the received signal's frequency profile.

II. Channel Estimation Module 14 a) Determination Means 16

Channel estimation module 14 includes, firstly, determination means 16 configured to determine:

intermediate frequency covariance matrix $M_{2f}$ representing the frequency variations of the channel due to the temporal profile of the channel centred on the timing synchronisation position, and intermediate temporal covariance matrix $M_{2t}$ representing the temporal variations of the channel due to the frequency profile of the channel centred on the frequency synchronisation position.

Intermediate frequency covariance matrix $M_{2f}$ may be determined, for example, by applying a Fourier transform to the spread window of the signal's temporal profile centred on the signal's timing synchronisation position.

Similarly, intermediate temporal covariance matrix $M_{2t}$ may be determined, for example, by applying an inverse Fourier transform to the spread window of the signal's frequency profile centred on the signal's frequency synchronisation position.

In addition, determination means 16 are configured to calculate an intermediate global covariance matrix $M_2$ according to the Kronecker product: $M_2 = M_{2t} \otimes M_{2f}$.

b) Calculation Means 18

Channel estimation module 14 also includes means 18 for calculating a matrix E' according to the relationship $E' = E \cdot T^H$, where $T = T_f \otimes T_t$, in which E is a diagonal matrix including the pilot symbols transmitted in a frame at the positions of the pilot symbols, where the other symbols are zero, $T_f$ is a diagonal centring matrix $(N_f, N_f)$ defined by $$T_f = \begin{bmatrix} 1 & 0 & \cdots & \cdots & 0 \\ 0 & e^{i\varphi} & \cdots & & \\ \cdots & \cdots & e^{i2\varphi} & \cdots & \\ \cdots & & \cdots & \cdots & 0 \\ 0 & \cdots & \cdots & 0 & e^{i(Nf-1)\varphi} \end{bmatrix}$$

where $\varphi = 2\pi \cdot \frac{\tau_{moyen}}{N_f}$( and $T_t$ is a diagonal centring matrix $(N_t, N_t)$ defined by $$T_t = \begin{bmatrix} 1 & 0 & \cdots & \cdots & 0 \\ 0 & e^{i\psi} & \cdots & & \\ \cdots & \cdots & e^{i2\psi} & \cdots & \\ \cdots & & \cdots & \cdots & 0 \\ 0 & \cdots & \cdots & 0 & e^{i(Nt-1)\psi} \end{bmatrix}$$

where $\psi = -2\pi \cdot \frac{f_{moyen}}{N_t}$ c) Estimation Means 20

Channel estimation module 14 also includes means 20 for estimating propagation channel 8 configured to calculate a column vector C' which minimises the relationship $$\frac{\|R - E' \cdot C'\|^2}{\sigma^2} + C'^H \cdot M_2^{-1} \cdot C'$$

where R is a column vector of dimension $(N_t \times N_f)$ consisting of the received symbols, and to estimate the channel according to the relationship $C = T^H \cdot C'$, from calculated vector C'.

III. Decoder 22

Receiver 2 also includes a decoder 22 providing an estimation of the symbols transmitted from the channel estimation made by channel estimation module 14.

Since the structure of the receiver of the invention has been described, the operation of the channel estimation method implemented in channel estimation module 14 will be described in detail.

IV. Application

In general terms the signal received by receiver 2 is written in the form R=E·C+B where R is a vector of dimension n consisting of the symbols received, C is a vector of dimension n representing propagation channel 8, E is a diagonal matrix of dimension (n,n) consisting of the symbols transmitted in a frame and B is a vector of dimension n representing the noise of channel 8.

It is considered conventionally that the channel noise is a Gaussian noise of variance, or power, $\sigma^2$. The probability of receiving vector R if channel vector C is known is then equal to $$e^{-\frac{\|R-EC\|^2}{2\sigma^2}}.$$

In addition, in the case of a land mobile radio channel varying according to a Rayleigh law, the channel's probability is equal to $$e^{-\frac{C^H \cdot M^{-1} \cdot C}{2}},$$

where $M_1$ is the global covariance matrix representing the real physical time and frequency constraints of channel 8, and where notation X" indicates that this is a conjugate transpose matrix X.

As regards the choice of $\sigma^2$ and of $M_1$, it should be noted that $M_1$ can be taken to be covariance matrix of the normalised channel, i.e. the channel of average unit power. In this case $\sigma^2$ then represents the inverse of the signal-to-noise ratio. A target signal-to-noise ratio value can be set, where this value does not change whatever the effective value of the noise power value and of the useful signal power value. Other solutions are possible, such as, for example, estimating the signal-to-noise ratio as the received information is received and demodulated, for example for the pilot symbols which are known to the transmitter and the receiver. In this case the signal-to-noise ratio can be modified dynamically in the channel estimation process.

The method according to the invention implements the maximum a posteriori or MAP criterion. The resolution of the channel estimation problem in the sense of the MAP amounts to maximising the probability that a virtual intermediate channel is equal to an intermediate channel vector C', if vector R is known, whilst responding to its physical constraints expressed in a global intermediate covariance matrix noted $M_2$, which is symmetrical and centred on a timing synchronisation position and on a frequency synchronisation position.

This amounts to maximising probability $$e^{-\frac{\|R-E'C'\|^2}{2\sigma^2}}, e^{-\frac{C'^H \cdot M_2^{-1} \cdot C'}{2}},$$

which amounts to minimising the opposite of the logarithm of this expression, equal to $$\frac{\|R - E'C'\|^2}{\sigma^2} + C'^H \cdot M_2^{-1} \cdot C'.$$

Solution C' is therefore the one for which the following expression, noted [1], obtained by cancelling the gradient relative to C' of the previous expression, is verified:

$$(E'^H \cdot E' + \sigma^2 \cdot M_2^{-1})C' = E'^H \cdot R \qquad [1].$$

Since only the pilot symbols are known to receiver 2, zeros are placed in matrix E' at the positions of the other symbols unknown to the receiver.

The constraints of channel 8 in the time domain are independent of its constraints in the frequency domain. The channel's covariance matrix $M_2$ is therefore separable in terms of time and frequency by expressing it as the Kronecker product of two covariance matrices $M_{2f}$ and $M_{2t}$, where matrix $M_{2f}$ expresses the channel's constraints in the frequency domain and matrix $M_{2t}$ expresses the channel's constraints in the time domain.

Thus, in a step 24a/24b, covariance matrices $M_{2f}$ and $M_{2t}$ of channel 8, respectively in the frequency domain and in the time domain, are determined by determination means 16 by using respectively the spread window of the temporal profile and the spread window of the frequency profile of channel 8 stored in memory 10. These matrices $M_{2f}$ and $M_{2t}$ are stored in memory 10.

According to the invention, intermediate covariance matrix $M_2$ is determined by determination means 16 in a step 26 according to the Kronecker product: $M_2 = M_{2t} \otimes M_{2f}$.

A matrix E is then calculated by calculation means 18 in a step 28 according to the relationship $E' = E \cdot T^H$, where $T = T_t \otimes T_f$ and in which E is a diagonal matrix including the pilot symbols transmitted in a frame at the positions of the pilot symbols, where the other symbols are zero.

Column vector C' which minimises the relationship $$\frac{\|R - E' \cdot C'\|^2}{\sigma^2} + C'^H \cdot M_2^{-1} \cdot C',,$$

is then calculated by estimation means 20 in a step 30a/30b by implementing the maximum a posteriori or MAP criterion in order to estimate propagation channel 8 according to relationship $C = T^H \cdot C'$.

Step 30a/30b of calculation of vector C' is described below in a first implementation 30a (steps 32 to 38) and in a second implementation 30b (steps 32 to 34 and 40 to 44) of the method according to the invention.

a) First Implementation

The flowchart of FIG. 2 illustrates a first implementation of the channel estimation method of the invention implementing the MAP criterion.

In a step 32, covariance matrices $M_{2f}$ v and $M_{2t}$ are decomposed into eigenvectors and eigenvalues by decomposition means 18 according to the relationships $M_F = W_F^H N_F W_F$ and $M_T = W_T^H N_T W_T$, in which:

$W_F$ is a matrix of eigenvectors of matrix $M_{2f}$;

$N_F$ is a diagonal matrix including eigenvalues associated with the eigenvectors of matrix $M_{2f}$;

$W_T$ is a matrix of eigenvectors of matrix $M_{2t}$; and $N_T$ is a diagonal matrix including eigenvalues associated with the eigenvectors of matrix $M_{2t}$.

In step 34, decomposition means 18 calculate the Kronecker product of the eigenvector matrices $W_F$ and $W_T$ to obtain a global matrix of eigenvectors W of dimension (n, n). They also calculate a global diagonal matrix of eigenvectors N of dimension (n, n) containing the products of the eigenvalues of matrices $N_F$, and $N_T$. Matrices $W_F$, $N_F$, $W_T$ and $N_T$ are also stored in memory 10.

Global intermediate covariance matrix $M_2$ of channel 8 is then equal to $M_2 = W^H N W$. Expression [1] can thus be written $(E'^H E' + \sigma^2 \cdot W^H \cdot N^{-1} \cdot W) \cdot C' = E'^H \cdot R$:

By supposing $C'=W^H \cdot \sqrt{N} \cdot b$ where b is a dimensional vector n, and where $\sqrt{N}$ is a diagonal matrix, each term of the diagonal of which is the square root of the corresponding term of the diagonal of diagonal matrix N, expression [1] is written: $(\sqrt{N} \cdot W \cdot E'^H \cdot E' \cdot W^H \cdot \sqrt{N} + \sigma^2 \cdot I)b = \sqrt{N} \cdot W \cdot E'^H \cdot R$ [2] where I is the identity matrix.

In step 36, channel estimation means 20 calculate matrix $P=\sqrt{N} \cdot W \cdot E'^H \cdot E' \cdot W^H \cdot \sqrt{N}$ and decompose this matrix P into eigenvectors and eigenvalues according to relationship $P=X^H Q X$ in which X is a matrix of eigenvectors of matrix P and Q is a diagonal matrix including eigenvalues associated with the eigenvectors of matrix P.

In step 38, channel estimation means 20 estimate channel 8 from relationship 2 according to the following expression [3]:

$$C'=W^H \cdot \sqrt{N} \cdot X^H \cdot (Q+\sigma^2 \cdot I)^{-1} \cdot X \cdot \sqrt{N} \cdot W \cdot E'^H \cdot R \quad [3].$$

a) Second Implementation

The flowchart of FIG. 3 illustrates a second implementation of the channel estimation method of the invention also implementing the MAP criterion. In this figure steps 24, 26, 28 and 30 to 34 are identical to those of FIG. 2. The description of these steps is not therefore repeated.

In step 40, channel estimation means 20 extract a diagonal matrix N' from matrix N, where matrix N' includes a determined number n' of the largest eigenvalues of N and determine a matrix W' including the eigenvectors associated with these n' largest eigenvalues. Matrices N' and W' are stored in memory 10.

The eigenvalues of matrix N generally decrease rapidly. The sum of the eigenvalues retained in matrix N' thus account for most of the energy of channel 8. Matrix W' thus includes the most representative eigenvectors to express the channel's constraints.

Expression [1] can thus be written: $(E'^H E' + \sigma^2 \cdot W'^H \cdot N'^{-1} \cdot W') \cdot C' = E'^H \cdot R$.

By supposing $C'=W'^H \cdot \sqrt{N'} \cdot b$ where b is a vector of dimension n', expression [1] is written $(\sqrt{N'} \cdot W' \cdot E'^H \cdot E' \cdot W'^H \cdot \sqrt{N'} + \sigma^2 \cdot I)b = \sqrt{N'} \cdot W' \cdot E'^H \cdot R$ [4] where I is the identity matrix.

In step 42, channel estimation means 20 calculate a matrix P' according to the relationship $P'=\sqrt{N'} \cdot W' \cdot E'^H \cdot E' \cdot W'^H \cdot \sqrt{N'}$ and decompose this matrix P' into eigenvectors and eigenvalues according to relationship $P'=X'^H Q' X'$ in which X' is a matrix of eigenvectors of matrix P' and Q' is a diagonal matrix including eigenvalues associated with the eigenvectors of matrix P'.

In step 44, channel estimation means 20 estimate channel 8 from relationship [4] according to the following expression [5]

$$C'=W'^H \sqrt{N'} \cdot X'^H \cdot (Q'+\sigma^2 \cdot I)^{-1} \cdot X' \cdot \sqrt{N'} \cdot W' \cdot E'^H \cdot R \quad [5].$$

Since matrix W' is of dimension (n',n') and matrix N' is of dimension (n',n'), this implementation allows less complex calculations than the first implementation.

In a preferred implementation, the n' eigenvectors of matrix W' are the Kronecker products of a limited number $n'_f$ of eigenvectors of matrix $W_F$ and of a limited number $n'_t$ of eigenvectors of matrix $W_E$ and the n' eigenvalues of matrix N' are the products of the eigenvalues of matrix $N_T$ corresponding to the n't eigenvectors of matrix $W_T$ and eigenvalues of matrix $N_T$ corresponding to the $n'_t$ eigenvectors of matrix $W_T$. In this case matrix W' is separable in terms of time and frequency. It can then be recorded in the form of the Kronecker product of two matrices, and it is then equal to a total dimension of $[(n'_f, n)+(n'_t, n)]$, which enables the complexity of the method to be reduced.

In both implementations described above, the matrix of real channel C is then estimated according to the invention in a step 50 according to the relationship $C=T^H \cdot C'$ to from calculated vector C'.

Other implementations can of course also be envisaged.

More specifically, the calculation of the covariance matrices can be accomplished dynamically in order to take into account the variations of the channel's constraints.

The invention claimed is:

1. A method for estimating a radio propagation channel between a transmitter and a receiver, where the transmitter transmits a signal including frames each of which uses $N_f$ frequency subcarriers over each of which $N_t$ symbols are transmitted, where among all the symbols, certain pilot symbols, are known to the receiver, where the signal is synchronised by the receiver from a timing synchronisation position and a frequency synchronisation position, wherein a temporal profile of the channel is symmetrical and centred around an effective central timing position $\tau_{mean}$ different from the timing synchronisation position, wherein a frequency profile of the channel is symmetrical and centred around an effective central frequency position $f_{mean}$ different from the frequency synchronisation position, and wherein the method, implemented by the receiver, comprises:

determining an intermediate frequency covariance matrix $M_{2f}$ representing frequency variations of the channel, due to a theoretical temporal profile of the channel, which is symmetrical and centred on the timing synchronisation position, wherein the theoretical temporal profile of the channel is obtained from the channel's temporal profile translated to a time of $\tau_{mean}$ so as to be symmetrical around the timing synchronisation position;

determining an intermediate temporal covariance matrix $M_{2t}$ representing temporal variations of the channel, due to a theoretical frequency profile of the channel, which is symmetrical and centred on the frequency synchronisation position, wherein the theoretical frequency profile of the channel is obtained from the channel's frequency profile translated to a frequency of $f_{mean}$ so as to be symmetrical around the frequency synchronisation position;

calculating an intermediate global covariance matrix $M_2$ according to the Kronecker product: $M_2 = M_{2t} \otimes M_{2f}$;

calculating a matrix E' according to the relationship $E'=E \cdot T^H$, where $T=T_t \otimes T_f$ and in which E' is a diagonal matrix including the pilot symbols transmitted in a frame at the positions of the pilot symbols, wherein the other symbols are zero, $T_f$ is a diagonal centring matrix $(N_f, N_f)$ defined by $$T_f = \begin{bmatrix} 1 & 0 & \cdots & \cdots & 0 \\ 0 & e^{i\varphi} & \cdots & & \\ \cdots & \cdots & e^{i2\varphi} & \cdots & \\ \cdots & & \cdots & \cdots & 0 \\ 0 & \cdots & \cdots & 0 & e^{i(Nf-1)\varphi} \end{bmatrix}$$

where $\varphi = 2\pi \cdot \dfrac{\tau_{moyen}}{N_f}$ and $T_t$ is a diagonal centring matrix $(N_t, N_t)$ defined by $$rT_t = \begin{bmatrix} 1 & 0 & \cdots & \cdots & 0 \\ 0 & e^{i\psi} & \cdots & & \\ \cdots & \cdots & e^{i2\psi} & \cdots & \\ \cdots & & \cdots & \cdots & 0 \\ 0 & \cdots & \cdots & 0 & e^{i(Nt-1)\psi} \end{bmatrix}$$

where $\psi = -2\pi \cdot \frac{f_{moyen}}{N_t}$;

calculating a column vector representing an intermediate channel C' which minimises the relationship $$\frac{\|R - E' \cdot C'\|^2}{\sigma^2} + C'^H \cdot M_2^{-1} \cdot C'$$

where R is a column vector of dimension $(N_t \times N_f)$ consisting of the received symbols, and;
estimating the propagation channel according to the relationship $C=T^H \cdot C'$, from calculated vector C'.

2. The method according to claim 1, wherein calculating the intermediate channel vector C' includes:
decomposing covariance matrices $M_{2f}$ and $M_{2t}$ into eigenvectors according to the relationships $M_{2f}=W_F{}^H N_F W_F$ et $M_{2t}=N_T W_T$, in which:
$W_F$ is a matrix of eigenvectors of matrix $M_{2f}$;
$N_F$ is a diagonal matrix including eigenvalues associated with the eigenvectors of matrix $M_{2f}$;
$W_F$ is a matrix of eigenvectors of matrix $M_{2f}$;
$N_T$ is a diagonal matrix including eigenvalues associated with the eigenvectors of matrix $M_{2f}$;
calculating a Kronecker product of the matrices of eigenvectors $W_F$ and $W_T$, to obtain a global matrix of eigenvectors W;
calculating a global diagonal matrix of eigenvectors N equal to the Kronecker product of matrices of eigenvalues $N_F$, and $N_T$; and
calculating the intermediate channel vector C' using the pilot symbols and the matrices of eigenvectors W' and of eigenvalues N' using the maximum a posteriori criterion.

3. The method according to claim 2, wherein calculating the intermediate channel vector C' includes:
calculating a matrix P according to a relationship $P=\sqrt{N} \cdot W \cdot E^H \cdot E \cdot W^H \cdot \sqrt{N}$ in which E is a diagonal matrix including the pilot symbols at the positions of the pilot symbols, where the other elements of the diagonal are zero;
decomposing matrix P into eigenvectors according to relationship $P=X^H Q X$ in which X is a matrix of eigenvectors of matrix P and Q is a diagonal matrix including eigenvalues associated with the eigenvectors of matrix P; and
calculating the intermediate channel vector C' according to the relationship $C=W^H \cdot \sqrt{N} \cdot X^H \cdot (Q+\sigma^2 \cdot I)^{-1} \cdot X \cdot \sqrt{N} \cdot W \cdot E^H \cdot R$ in which C is a vector representing the channel, I is the identity matrix, R is a vector including the received symbols and $\sigma^2$ represents a power value of the noise in the channel.

4. The method according to claim 2, wherein calculating the intermediate channel vector C' includes:
extracting a matrix W' from matrix W and of a matrix N' from matrix N, wherein matrix N' includes a determined number n' of eigenvalues of matrix N and matrix W' includes the eigenvectors associated with these n' eigenvalues; and
calculating the intermediate Channel vector C' using the pilot symbols and the matrices of eigenvectors W' and of eigenvalues N' using the maximum a posteriori criterion.

5. The method according to claim 4, wherein the n' eigenvalues are the highest eigenvalues of matrix N.

6. The method according to claim 4, wherein the n' eigenvectors of matrix W' are the Kronecker products of a limited number $n'_f$ of eigenvectors of matrix $W_F$ and of a limited number $n'_t$ of eigenvectors of matrix $W_T$ and the n' eigenvalues of matrix N' are the products of the eigenvalues of matrix $N_F$ corresponding to the $n'_f$ eigenvectors of matrix $W_F$ and eigenvalues of matrix $N_T$ corresponding to the $n'_t$ eigenvectors of matrix $W_T$.

7. The method according to claim 4, wherein n' is less than or equal to the number of pilot symbols in each frame.

8. The method according to claim 4, wherein calculating the intermediate channel vector C' includes:
calculating a matrix P' according to the relationship $P'=\sqrt{N'} \cdot W' \cdot E'^H \cdot E' \cdot W'^H \cdot \sqrt{N'}$ in which E is a diagonal matrix including the pilot symbols at the positions of the pilot symbols, where the other elements of the diagonal are zero;
decomposing the matrix P' into eigenvectors according to relationship $P'=X'^H Q' X'$ in which X' is a matrix of eigenvectors of matrix P' and Q' is a diagonal matrix including eigenvalues associated with the eigenvectors of matrix P'; and
calculating the intermediate channel vector C' according to the relationship $C'=W'^H \cdot \sqrt{N'} \cdot X'^H \cdot (Q'+\sigma^2 \cdot I)^{-1} \cdot X' \cdot \sqrt{N'} \cdot W' \cdot E'^H \cdot R$ in which C is a vector representing the channel, I is the identity matrix, R is a vector including the received symbols and $\sigma^2$ represents the power value of the noise in the channel.

9. The method according to claim 1, wherein the signal is a multicarrier signal.

10. A receiver device configured to receive from a transmitter at least one signal transmitted through a radio propagation channel, wherein the signal includes frames each using $N_f$ frequency subcarriers over each of which $N_t$ symbols are transmitted, wherein from among all the symbols, certain pilot symbols, are known to the receiver device, wherein the signal is synchronised by the receiver device from a timing synchronisation position and from a frequency synchronisation position, wherein the temporal profile of the channel is symmetrical and centred around an effective central timing position $\tau_{mean}$ separate from the timing synchronisation position, and wherein the frequency profile of the channel is symmetrical and centred around an effective central frequency position $f_{mean}$ separate from the frequency synchronisation position, the receiver device comprising:
means for determining an intermediate frequency covariance matrix $M_{2f}$ representing the frequency variations of the channel, due to a theoretical temporal profile of the channel, which is symmetrical and centred on the timing synchronisation position, wherein the theoretical temporal profile of the channel is obtained from the channel's temporal profile translated to a time of $\tau_{mean}$ so as to be symmetrical around the timing synchronisation position;
means for determining an intermediate temporal covariance matrix $M_{2t}$ representing the temporal variations of the channel, due to a theoretical frequency profile of the channel, which is symmetrical and centred on the frequency synchronisation position, wherein the this theoretical frequency profile of the channel is obtained from the channel's frequency profile translated to a frequency of $f_{mean}$ so as to be symmetrical around the frequency synchronisation position;
means for calculating an intermediate global covariance matrix $M_2$ according to the Kronecker product:
$M_2=M_{2t} \otimes M_{2f}$;

means for calculating a matrix E' according to the relationship $E' = E \cdot T^H$, wherein $T = T_t \otimes T_f$ and in which E is a diagonal matrix including the pilot symbols transmitted in a frame at the positions of the pilot symbols, where the other symbols are zero, $T_f$ is a diagonal centring matrix defined by $$T_f = \begin{bmatrix} 1 & 0 & \ldots & \ldots & 0 \\ 0 & e^{i\varphi} & \ldots & & \\ \ldots & \ldots & e^{i2\varphi} & \ldots & \\ \ldots & & \ldots & \ldots & 0 \\ 0 & \ldots & \ldots & 0 & e^{i(Nf-1)\varphi} \end{bmatrix}$$

where $\varphi = 2\pi \cdot \dfrac{\tau_{moyen}}{N_f}$ and $T_f$ is a diagonal centring matrix $(N_t, N_t)$ defined by $$= \begin{bmatrix} 1 & 0 & \ldots & \ldots & 0 \\ 0 & e^{i\psi} & \ldots & & \\ \ldots & \ldots & e^{i2\psi} & \ldots & \\ \ldots & & \ldots & \ldots & 0 \\ 0 & \ldots & \ldots & 0 & e^{i(Nt-1)\psi} \end{bmatrix}$$

where $\psi = -2\pi \cdot \dfrac{f_{moyen}}{N_t}$;

means for calculating a column vector representing an intermediate channel C' which minimises the relationship $$\dfrac{\|R - E' \cdot C'\|^2}{\sigma^2} + C'^H \cdot M_2^{-1} \cdot C'.$$

where R is a column vector of dimension $(N_t \times N_f)$ consisting of the received symbols, and;

means for estimating the propagation channel according to the relationship $C = T^H \cdot C'$, from calculated vector C'.

11. A non-transitory tangible computer program product including code instructions to implement the method according to claim 1 when the program is executed by at least one processor.

12. The method according to claim 9, wherein the signal is an OFDM signal.

* * * * *